No. 674,302. Patented May 14, 1901.
O. C. MOORE.
NUT LOCK.
(Application filed Oct. 13, 1899.)
(No Model.)
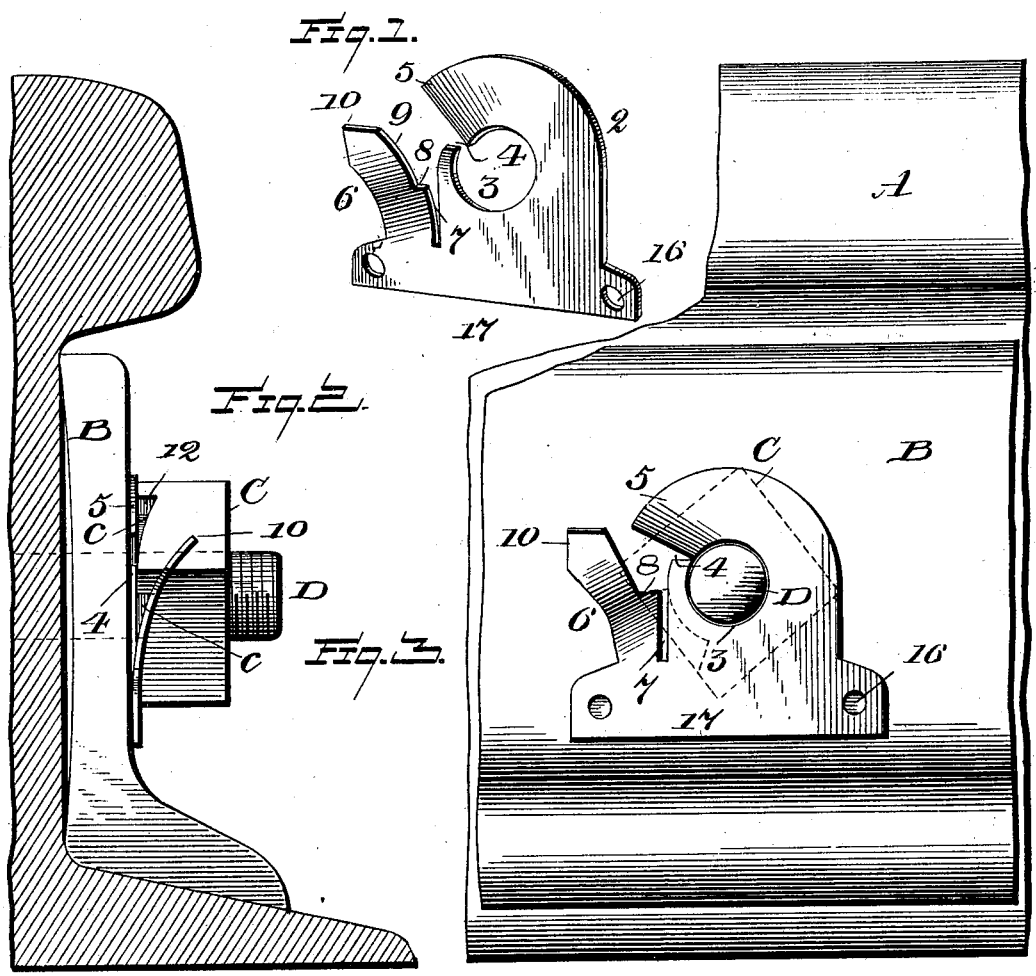
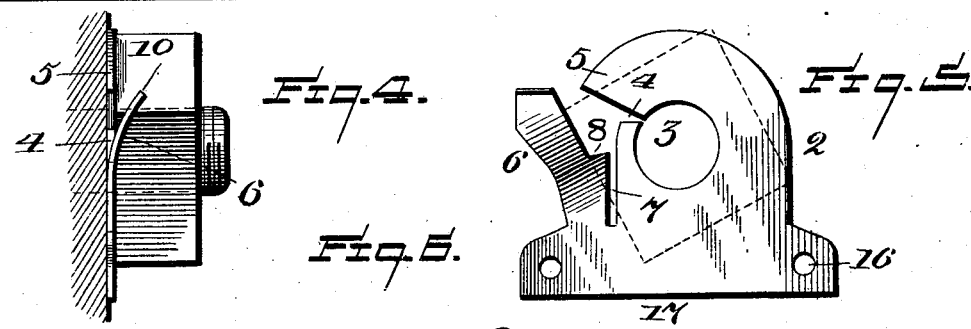
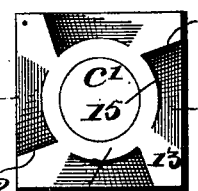
Witnesses
L. C. Hills
Geo. T. May Jr.
Inventor:
Otho C. Moore
By John S. Barker and
Clarence A. Brandenburg
Attorneys

UNITED STATES PATENT OFFICE.

OTHO C. MOORE, OF NORFOLK, VIRGINIA, ASSIGNOR OF ONE-FOURTH TO JAMES BARKLEY, OF SAME PLACE.

NUT-LOCK.

SPECIFICATION forming part of Letters Patent No. 674,302, dated May 14, 1901.

Application filed October 13, 1899. Serial No. 733,500. (No model.)

*To all whom it may concern:*

Be it known that I, OTHO C. MOORE, a citizen of the United States, residing at Norfolk, in the county of Norfolk and State of Virginia, have invented certain new and useful Improvements in Nut-Locks, of which the following is a specification.

My invention relates to nut-locks, and has for its object to produce a nut-lock particularly adapted for railway and structural ironwork and structural iron and wood work which shall effectively hold the nut against backing off its bolt and becoming loose, which shall possess the requisite strength and shall not be liable to become broken, and which is adapted for use in connection with either ordinary plain-faced nuts or with specially-constructed nuts having their faces specially shaped to coöperate with the holding part or member of the nut-lock.

In the accompanying drawings, Figure 1 is a perspective view of a nut-lock of the most approved form made according to my invention. Fig. 2 is an edge view of the nut-lock represented as being used in connection with a railroad-rail and a nut of peculiar construction. Fig. 3 is a face view of the parts represented in Fig. 2. Fig. 4 is an edge view, and Fig. 5 a face view or elevation, illustrating the nut-lock when used in combination with an ordinary plain-faced nut. Fig. 6 is a face view of a specially-constructed nut which I prefer to employ in connection with the nut-lock which I have invented.

In the drawings, A represents a railway-rail; B, a fish plate or bar; C, a nut, and D the bolt upon which the nut is mounted. I have chosen the rail and fish-plate to represent two parts of a structure which are to be united and held firmly together by the bolt D and nut C, and whenever in this specification I employ the terms "rail" and "fish-bar" or "fish-plate" I wish to be understood as using them in a broad sense, as inclusive of any parts of a structure, whether made of metal or other material, which it is desired to unite or hold together by bolts and nuts.

The nut-lock, which is represented detached in Fig. 1, is formed from a piece of thin or sheet metal of sufficient elasticity to give the several parts thereof their required spring action. It is formed of a plate of metal 2 preferably shaped in general outline as represented in Figs. 1 and 3 and perforated at 3 for the passage of the bolt D. I prefer that the plate 2 should be slit or cut from the aperture 3 outward to the edge of the plate, as represented at 4, and that a part 5 of the plate 2 adjacent to such slit 4 should be bent backward and out of the plane of the plate 2 in order that the plate may form a spring-washer.

6 represents a spring locking-tongue which is adapted to engage with the nut and to hold it against working backward or off the bolt. It is formed integral with the plate 2 and is separated from the portion of the plate which immediately surrounds the aperture 3, as by the cut or slit 7, and it is bent so that it stands with its upper portion forward of the plane of the plate 2. This spring-tongue 6 is formed with a shoulder 8 and with an inclined edge 9, extending from the shoulder and so disposed as to be adapted to engage with the outer sides or edges c of the nuts C. It will be observed that the edge 9 is arranged at an angle of about forty-five degrees to the axis of the rail and that the shoulder 8 is substantially parallel with such axis. By this arrangement a square nut will be held in the positions indicated in Figs. 3 and 5—that is to say, with two of its opposite corners arranged in line with the axis of the rail—the advantages of which will be set forth hereinafter. The position of the shoulder 8 relative to the aperture 3 is such that the nut when upon the bolt always lies over or covers this part of the spring-tongue, while the extended or end portion 10 of the spring-tongue, which is beyond the shoulder 8 and one edge of which is represented at 9, extends beyond the sides of the nut, this being clearly represented in Figs. 3 and 5. It will thus be seen that a portion of the spring-tongue 6 when in use is always under the nut and between it and the fish-plate and that another portion of the spring-tongue lies beyond the side of the nut and is formed with an edge or bearing with which the sides of the nut are adapted to engage. The spring-tongue is so bent or curved outward relative to the plate 2 that the portion 10 which is not covered by the nut and by it held clamped against the fish-bar springs forward, with the result that the edge 9 is always in position to engage with the sides of the nut and obstruct the backward movement thereof.

A plain-faced nut, like that represented in Figs. 4 and 5, may be used in connection with and locked by the nut-lock already described, and when such a form of nut is used the shouldered portion of the spring holding-tongue lies under the nut, and this underlying portion of the tongue is immediately adjacent to that part of the edge 9 with which the nut engages and which serves as the lock therefor. I prefer, however, to use a specially-constructed nut, as is represented in Figs. 6, 2, and 3. In one face of the nut there are formed a number of recesses, preferably one adjacent to each edge c of the nut, the bottoms 11 of which recesses are inclined, as represented in Figs. 2 and 6, and terminate in the shoulders or abrupt edges 12. The nut is preferably formed with a flat face or collar 14, immediately surrounding the threaded opening c' in the nut, and with flat faces 13 at the angles of the nut, separating the recesses already referred to and in the same plane as the collar 14. I prefer that the bottom 11 of each recess when taken along in a line radial to the nut should be parallel or substantially parallel with the face 13 14 of the nut, so that the surface 15, which bounds the collar adjacent to the recess, is progressively broader from the starting of the recess to the shoulder 12.

The disposition of the shouldered portion 8 of the locking spring-tongue is preferably such that it will enter the recesses in the face of the nut and that the shoulder 8 of the spring-tongue will engage with the shoulder 12 of the nut at the same time that the side c of the nut comes into engagement with the edge 9 of the spring-tongue. This arrangement causes a double lock of the nut. It also insures that any pressure which may be exerted by the nut tending to work off the bolt and which may be brought against the spring-tongue will be applied to the latter in such direction that it will be resisted by the spring-tongue without danger of breaking the latter.

In nut-locks as heretofore constructed, with a spring-tongue adapted to rest against the sides of the nut and hold it against backward turning, there has frequently been a tendency on the part of the spring-tongue to rise against the face of the nut and to finally become bent or broken. This, however, cannot occur in a nut-lock such as I have invented, wherein a portion of the spring locking-tongue adjacent to the part which engages with the side of the nut lies under the nut and is held down thereby.

By forming the recesses in the face of the nut, as described, the shouldered part of the spring-tongue is permitted to freely enter the recess and to have a firm engagement with the shoulder 12.

By forming the nut with the central collar portion 14 around the bolt-hole c' and between such hole and the recesses 11 the thread of the nut is unbroken from face to face of the nut, with the result that the nut may be more easily and certainly started upon the bolt than if the thread were cut by reason of the recesses extending quite to the bolt-hole. Further, the collar presents a continuous bearing around the bolt-hole for engagement with the locking-plate with the results that the said plate is less liable to become broken in screwing up the nut than if such bearing-face were interrupted or broken and the nut has less tendency to back off the bolt under the jars and movements to which it is subjected. As clearly shown in the drawings, the shoulders 12 of the recesses 11 are each situated to one side of a radial line extending to a corner of the nut, and this insures that the side locking portion 10 of the spring-tongue shall be in proper position to engage with the side edge c of the nut whenever the shouldered portion 8 thereof enters a recess and engages with a shoulder 12. The flat-faced portions 13 of the nut, which are in the same or substantially the same plane as the collar 14, serve to increase the effective bearing-surface of the nut for engagement with the part against which it is screwed.

I prefer to provide the nut-lock with apertures 16, whereby it may be fastened by nails or screws to the bar or piece against which it is placed, if this should be found desirable. It will be understood that in ordinary railroad or other iron work no such fastening is required.

In a form of nut-lock like that shown the base or bottom edge 17 of the plate 2 will rest against the lower flange of the fish-bar or of the rail.

It will be understood that the extent to which the parts 5 and 6 are offset may be varied according to the requirements of the use to which the lock is put. It will also be understood that the location of the shoulder 8 and of the recesses in the face of the nut may be varied somewhat from what is illustrated in the drawings without departing from the principle of my invention.

It is a well-known fact that where a square nut lies against a bar in which is formed a slot for the purpose of allowing longitudinal expansion and contraction the tendency of the nut is to assume a position with two of its opposite corners in line with the slot, and hence in line with the structure, such as a railway-track, of which the nut is a part. It is therefore desirable to lock the nut in this position, as then there is less tendency on the part of the nut to move, and hence less strain upon the locking device. I have therefore devised the nut-lock herein described so that it locks the nut in this position—that is, with two of its opposite corners in line with the axis of the rail or track. To secure this, the locking-tongue 6 is so disposed that the edge 9, with which the edge of the nut engages, is arranged at an angle of about forty-five degrees to the axis of the rail. When thus disposed, the nut is so held that it covers to the greatest extent possible the portion of the nut-lock which is situated directly above the opening 3 for the bolt. In railway construction, for which my invention is particularly adapted, it has been demonstrated that the greatest strain upon the nut and upon the lock therefor is on the portion directly above the bolt-hole, and many nut-locks as heretofore devised have been structurally weak and have been broken at this point. I overcome this liability of breakage, in the first place, by so making the nut-lock that the metal thereof which surrounds the bolt-hole is continuous or unbroken, except for the single cut or slit at 4, as a fracture is liable to take place starting from any slit or cut extending outward from the bolt-hole, particularly if such slit or cut be above the axis of the hole, and, in the second place, by so locking the nut that one of its corners, and hence one of its thickest parts, lies directly over this upper portion of the nut-lock to strengthen and sustain the same.

It will be observed that the tongue 6 is partially separated from the plate 2 by a slot 7, extending downward from the shoulder 8. This construction insures that the spring-tongue 6 shall have the desired resiliency and shall not be liable to become "set" after the nut has been once securely screwed up close to the fish-plate.

By arranging the two faces 9 and 8 of the spring-tongue as I have described and using in connection therewith a specially-formed nut such as described the strain which is exerted upon the tongue by the nut tending to back off the bolt is resisted both by the face 9 and by the shoulder 8, so that the force which is applied to the tongue and which would tend to break it off is applied in the direction of its greatest strength—that is, in the direction of a line passing through it from the shoulder and about midway between the lower end of the slot 7 and the opposite lower end of the outer edge of the tongue.

When it is desired to remove the nut, the spring-locking tongue is pressed back against the fish-plate until it disengages the nut, when the latter may be turned by any suitable means. The wrenches which are employed for use in tightening and removing the nuts may be so constructed as to press back the spring-tongue when used to remove a nut.

Having described my invention, what I claim, and desire to secure by Letters Patent, is—

1. The combination, with a nut having shouldered recesses formed in one of its flat faces, of a lock for such nut having a shouldered spring locking-tongue 6, the end portion of the tongue extending beyond the shoulder part thereof being formed with an edge 9 arranged to engage with the side of the nut, and disposed at an angle of approximately forty-five degrees to the longitudinal axis of the structure of which the nut is a part, and the shoulder 8 of the spring locking-tongue being substantially parallel with such axis, substantially as set forth.

2. A nut-lock consisting of a plate perforated for the passage of a bolt, arranged to lie between a nut on the bolt and a fish-bar, the plate being slit at 7 on a line substantially at right angles to the longitudinal axis of the structure upon which the nut-lock is used, thereby forming a locking-tongue 6, the nut-engaging edge of said tongue being formed at an acute angle to the said slit 7, and being also formed with a shoulder 8, the said shoulder being interposed between the edge 9 of the locking-tongue and the slit 7, substantially as set forth.

3. The combination of a nut adapted to engage with a screw-threaded bolt, having one face formed with a series of shouldered recesses therein, and with a flat-faced collar, 14, surrounding the threaded hole in the nut, and a lock for the nut formed of a plate of spring or elastic metal perforated for the passage of the bolt, the portion of the plate surrounding the bolt-hole being slit and bent to form a spring-washer, and the plate of the lock being formed with an outward-extending spring locking-tongue, 6, which is separated from the portion of the plate which surrounds the hole for the bolt by a slit or cut, 7, whereby there is formed between the said slit or cut and the bolt-hole a tongue adapted to engage with the collar 14 of the nut, the said spring locking-tongue having the end portion, 10, which extends beyond the shouldered part thereof arranged to engage with a side face of the nut, and the shouldered part of the locking-tongue being arranged to extend under the nut adjacent to the side thereof with which the end portion of the tongue engages, to engage with one of the recesses in the face of the nut at the same time that the end portion, 10, engages with the side thereof.

In testimony whereof I have signed my name to this specification in the presence of two witnesses.

OTHO C. MOORE.

Witnesses:
  J. S. BARKER,
  JAMES BARKLEY.